(12) United States Patent
Hamano

(10) Patent No.: US 10,623,671 B2
(45) Date of Patent: Apr. 14, 2020

(54) IMAGE-CAPTURING APPARATUS AND CONTROL METHOD THEREFOR

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/812,489

(22) Filed: Nov. 14, 2017

(65) Prior Publication Data

US 2018/0146147 A1 May 24, 2018

(30) Foreign Application Priority Data

Nov. 18, 2016 (JP) ................................. 2016-225557

(51) Int. Cl.
| | |
|---|---|
| *H04N 5/225* | (2006.01) |
| *H04N 5/357* | (2011.01) |
| *G02B 7/34* | (2006.01) |
| *H04N 5/232* | (2006.01) |
| *H04N 5/369* | (2011.01) |
| *G02B 7/14* | (2006.01) |
| *G02B 7/36* | (2006.01) |
| *H04N 9/07* | (2006.01) |

(52) U.S. Cl.
CPC ............. *H04N 5/3572* (2013.01); *G02B 7/14* (2013.01); *G02B 7/346* (2013.01); *G02B 7/365* (2013.01); *H04N 5/23212* (2013.01); *H04N 5/232122* (2018.08); *H04N 5/3696* (2013.01); *H04N 5/36961* (2018.08); *H04N 9/07* (2013.01)

(58) Field of Classification Search
CPC ...................... H04N 5/232122; H04N 5/23212
See application file for complete search history.

(56) References Cited

U.S. PATENT DOCUMENTS

| | | | | |
|---|---|---|---|---|
| 2005/0185086 A1* | 8/2005 | Onozawa | ........... | H04N 5/23212 348/349 |
| 2008/0259202 A1* | 10/2008 | Fujii | ................. | H04N 5/23212 348/345 |
| 2008/0317454 A1* | 12/2008 | Onuki | ...................... | G02B 7/08 396/128 |
| 2010/0053350 A1* | 3/2010 | Miyauchi | ........... | G02B 27/0075 348/222.1 |
| 2012/0274837 A1* | 11/2012 | Yamasaki | .............. | G02B 7/285 348/360 |

(Continued)

FOREIGN PATENT DOCUMENTS

JP 5300414 B 9/2013

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

The image-capturing apparatus includes an image sensor configured to capture an object image formed by an image-capturing optical system, a focus detector configured to produce a focus state of the image-capturing optical system to produce focus detection information, a first acquirer configured to acquire a first correction value relating to the image-capturing optical system, and a second acquirer configured to acquire a second correction value relating to the image sensor. The apparatus further includes a controller configured to perform focus control using the focus detection information corrected with the first and second correction values.

14 Claims, 7 Drawing Sheets

(56) References Cited

U.S. PATENT DOCUMENTS

2015/0326798 A1* 11/2015 Muto ................. H04N 5/23229
                                                        348/239
2017/0272643 A1* 9/2017 Tamaki ............ H04N 5/232122
2018/0084192 A1* 3/2018 Suzuki ............. H04N 5/232122

* cited by examiner

| | | ZOOM POSITION | | | | | | | |
|---|---|---|---|---|---|---|---|---|---|
| | | 1 | 2 | 3 | 4 | 5 | 6 | 7 | 8 |
| FOCUS POSITION | 1 | BF111 | BF112 | BF113 | BF114 | BF115 | BF116 | BF117 | BF118 |
| | 2 | BF121 | BF122 | BF123 | BF124 | BF125 | BF126 | BF127 | BF128 |
| | 3 | BF131 | BF132 | BF133 | BF134 | BF135 | BF136 | BF137 | BF138 |
| | 4 | BF141 | BF142 | BF143 | BF144 | BF145 | BF146 | BF147 | BF148 |
| | 5 | BF151 | BF152 | BF153 | BF154 | BF155 | BF156 | BF157 | BF158 |
| | 6 | BF161 | BF162 | BF163 | BF164 | BF165 | BF166 | BF167 | BF168 |
| | 7 | BF171 | BF172 | BF173 | BF174 | BF175 | BF176 | BF177 | BF178 |
| | 8 | BF181 | BF182 | BF183 | BF184 | BF185 | BF186 | BF187 | BF188 |

IMAGE-CAPTURING APPARATUS AND CONTROL METHOD THEREFOR

BACKGROUND OF THE INVENTION

Field of the Invention

The present invention relates to image-capturing apparatuses such as digital cameras and video cameras.

Description of the Related Art

Image-capturing apparatuses include ones capable of performing phase difference detection method focus detection using an image sensor for capturing object images. Japanese Patent No. 5300414 discloses a digital camera having a pupil division function that partial pixels of an image sensor photoelectrically convert light fluxes passing through mutually different areas of an exit pupil of an image-capturing optical system. The partial pixels, which are focus detection pixels, are disposed among image-capturing pixels.

However, aberration of the image-capturing optical system causes difference between a best image surface of the light fluxes received by the focus detection pixels and a best image surface of light fluxes received by the image-capturing pixels. In this case, even though an in-focus state is obtained using outputs from the focus detection pixels, an in-focus state of a captured image produced using outputs from the image-capturing pixels is not obtained. Japanese Patent No. 5300414 further discloses a method in which an interchangeable lens transmits, to the camera, focus correction information used for correcting the above difference between the best image surfaces, and in which the camera performs focus correction (that is, corrects a focus detection result) using the focus correction information.

However, various digital cameras to which an interchangeable lens is detachably attachable produce, depending on pixel pitches of their image sensors and image production algorithms, various captured images whose characteristics, that is, visual focus states are mutually different. Japanese Patent No. 5300414 does not disclose focus correction depending on such characteristics of the captured images produced by the respective cameras.

SUMMARY OF THE INVENTION

The present invention provides an image-capturing apparatus that enables sufficiently correcting a focus detection error caused by aberration of an image-capturing optical system regardless of characteristics of captured images. The present invention provides an interchangeable lens detachably attachable to the above image-capturing apparatus.

The present invention provides as an aspect thereof an image-capturing apparatus including an image sensor configured to capture an object image formed by an image-capturing optical system, a focus detector configured to produce a focus state of the image-capturing optical system to produce focus detection information, a first acquirer configured to acquire a first correction value relating to the image-capturing optical system, a second acquirer configured to acquire a second correction value relating to the image sensor, and a controller configured to perform focus control using the focus detection information corrected with the first and second correction values.

The present invention provides as another aspect thereof an interchangeable lens detachably attachable to an image-capturing apparatus. The interchangeable lens includes an image-capturing optical system, a first memory configured to store a first correction value relating to the image-capturing optical system, a second memory configured to store information on aberration of the image-capturing optical system, a communicator configured to communicate with the image-capturing apparatus. The communicator is configured to transmit the first correction value and the information on the aberration to the image-capturing apparatus, and configured to receive, from the image-capturing apparatus, a focus control command for the image-capturing optical system, the command being produced by the image-capturing apparatus using a focus detection result corrected with the first correction value and the information on the aberration.

The present invention provides as yet another aspect thereof a method of controlling an image-capturing apparatus including an image sensor configured to capture an object image formed by an image-capturing optical system. The method includes a step of detecting a focus state of the image-capturing optical system to produce focus detection information, a step of acquiring a first correction value relating to the image-capturing optical system, a step of acquiring a second correction value relating to the image sensor, and a step of performing focus control using the focus detection information corrected with the first and second correction values.

The present invention provides as still another aspect thereof a non-transitory storage medium storing a focus control program that causes a computer in an image-capturing apparatus including an image sensor configured to capture an object image formed by an image-capturing optical system to execute the above method.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 1:
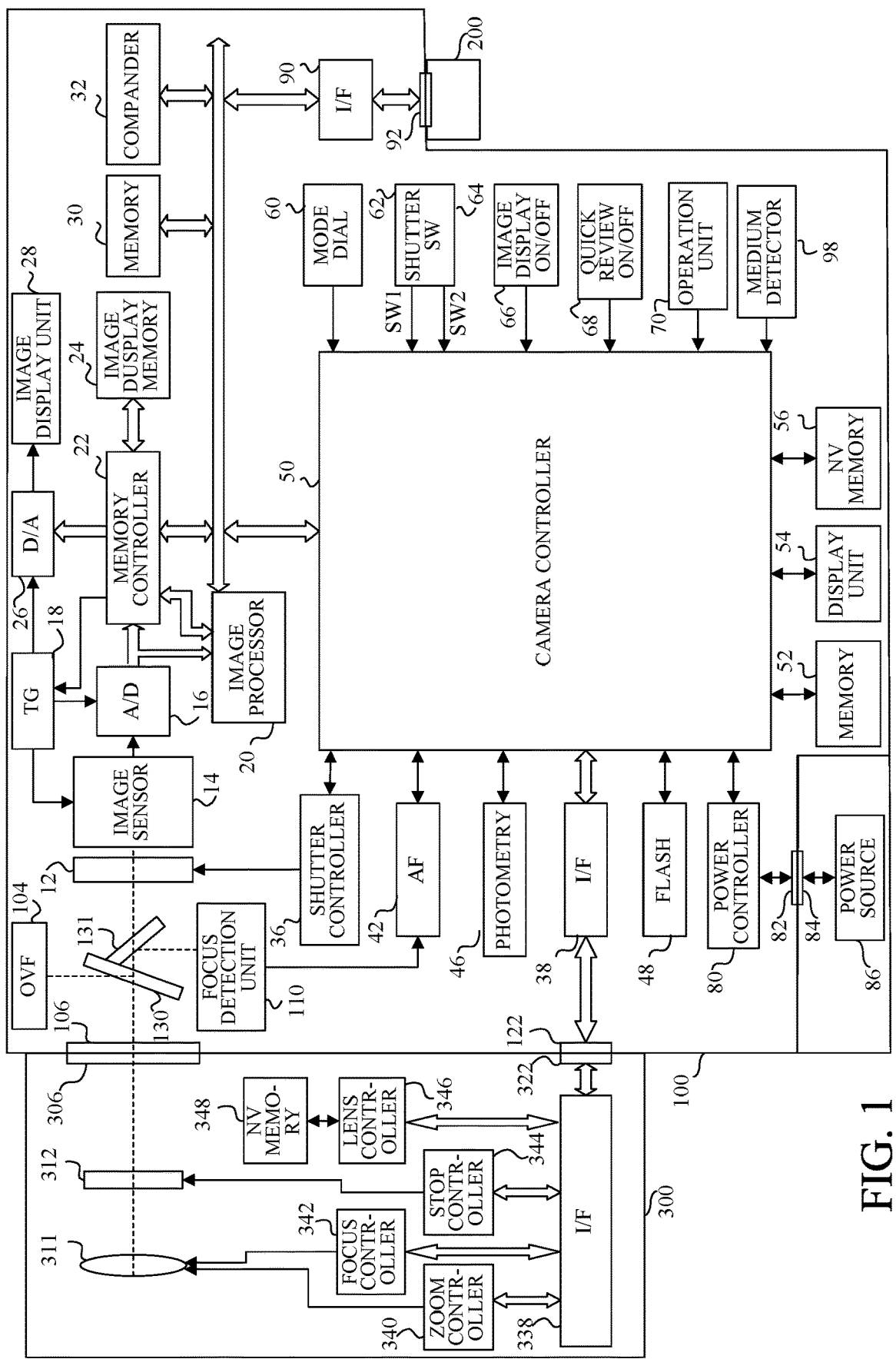
FIG. 1 is a block diagram illustrating a configuration of an image-capturing apparatus that is an embodiment of the present invention.

FIG. 1 illustrates an image-capturing system including a digital camera (hereinafter simply referred to as "a camera") as an image-capturing apparatus to which multiple types (models) of interchangeable lenses whose focal lengths or F-numbers are mutually different and multiple identical model interchangeable lenses whose product serial numbers are mutually different can be selectively attachable. FIG. 1 illustrates the camera 100 to which an interchangeable lens (lens apparatus) 300 as a representative one of the above-described multiple interchangeable lenses. The interchangeable lens 300 has a zoom function. However, interchangeable lenses having no zoom function can be attached to the camera 300.

A light flux from an object (not illustrated) passes through an image-capturing optical system (including a lens unit 311 and an aperture stop 312) in the interchangeable lens 300, and then passes through a camera mount 106 to enter the camera 100. Part of the light flux is reflected upward in FIG. 1 by a main mirror 130 disposed in an image-capturing optical path and formed by a half mirror to enter an optical view-finder 104. The optical view-finder 104 enables user's observation of an optical image of the object (object image formed by the light flux from the image-capturing optical system). This state is hereinafter referred to as "an optical view-finder state".

On the other hand, a remaining light flux not reflected by the main mirror 130 is transmitted therethrough and is reflected downward in FIG. 1 by a sub-mirror 131 to enter a focus detection unit 110. The focus detection unit 110 includes an AF sensor (not illustrated), such as paired line sensors. The AF sensor photoelectrically converts paired focus detection object images formed by a secondary image-forming optical system (not illustrated) to produce paired phase difference image signals and output them to an AF processor 42.

The AF processor 42 calculates a phase difference between the paired phase difference image signals, and then calculates, from the phase difference, a defocus amount as focus detection information indicating a focus state of the image-capturing optical system (that is, of the object image). The AF processor 42 further corrects the defocus amount as described later, and outputs a corrected defocus amount to a camera controller 50. The camera controller 50 calculates, from the corrected defocus amount, a drive amount of a focus lens included in the lens unit 311. The drive amount of the focus lens is hereinafter referred to as "a focus drive amount".

Then, the camera controller 50 transmits a focus control command including the focus drive amount to a focus controller 342 in the interchangeable lens 300 via a camera communication I/F 38 and a lens communication I/F 338. The focus controller 342 drives the focus lens depending on the focus drive amount included in the focus control command. Thus, AF sensor phase difference AF is performed, which is focus control (AF) with a phase difference detection method using the focus detection unit (AF sensor) 110 including photoelectric conversion elements different from an image sensor 14 described later.

After the drive of the focus lens in the interchangeable lens 300, when still image capturing or moving image capturing (including live-view image capturing) is performed, a quick-returning mechanism (not illustrated) moves the main mirror 130 and the sub mirror 131 to outside the image-capturing optical path. Thereby, the light flux from the image-capturing optical system reaches the image sensor (first image sensor) 14 through a shutter 12.

The image sensor 14 photoelectrically converts (that is, captures) a to-be-captured object image formed by the light flux from the image-capturing optical system. In the following description, a state of performing still image capturing for producing a still image to be recorded is referred to as "a still image capturing state", a state of performing live-view image capturing for producing a live-view image is referred to as "a live-view image capturing state", and a state of performing moving image capturing for producing a moving image to be recorded is referred to as "a moving image capturing state".

After the still image capturing, the live-view image capturing and the moving image capturing, the main and sub mirrors 130 and 131 are returned to their original positions illustrated in FIG. 1. The image sensor 14 produces an analog image-capturing signal as an electronic signal, and outputs it to an A/D converter 16 that converts the analog image-capturing signal into image data as a digital signal.

A timing generator 18 provides clock signals and control signals to the image sensor 14, the A/D converter 16 and a D/A converter 26 described later. The timing generator 18 is controlled by a memory controller 22 and the camera controller 50.

An image processor 20 performs image processes such as a pixel interpolation process and a color conversion process on the image data input from the A/D converter 16 or the memory controller 22. The image processor 20 further converts the image data into focus detection image data, and outputs it to the AF processor 42 through the camera controller 50.

The AF processor 42 calculates, as described above, the phase difference between the paired phase difference image signals acquired from the focus detection image data, and calculates the defocus amount from the phase difference. The AF processor 42 further corrects the defocus amount as in the AF sensor phase difference AF, and outputs the corrected defocus amount to the camera controller 50. The camera controller 50 calculates the focus drive amount from the corrected defocus amount, and transmits, to the focus controller 342 via the camera and lens communication I/Fs 38 and 338, the focus control command including the focus drive amount. The focus controller 342 drives the focus lens in the lens unit 311 depending on the focus drive amount. Thus, imaging surface phase difference AF is performed, which is focus control (AF) with the phase difference detection method using the focus detection image data acquired through the image sensor 14.

In this embodiment, the camera controller 50 may perform contrast AF that is focus control with a contrast detection method using a contrast evaluation value calculated by the image processor 20 from the image data.

As described above, the camera 100 performs the AF sensor phase difference AF in an object observation state where the main and sub mirrors 130 and 131 are located in the image-capturing optical path and thereby the object image can be observed through the optical view-finder 104.

On the other hand, in the still and moving image capturing states where the main and sub mirrors 130 and 131 are moved outside the image-capturing optical path, the camera 100 performs the imaging surface phase difference AF and the contrast AF. The memory controller 22 controls the A/D converter 16, the timing generator 18, the image processor 20, an image displaying memory 24, the D/A converter 26, a memory 30 and a compander 32.

The image data output from the A/D converter 16 is written to the image display memory 24 or the memory 30 directly or through the image processor 20 and the memory controller 22. The display image data written to the image display memory 24 is converted by the D/A converter 26 into an analog signal to be displayed on an image display unit 28 constituted by a liquid crystal panel or the like. Displaying moving image data produced through the image sensor 14 on the image display unit 28 provides an electronic view-finder function.

The memory 30 stores captured still image data and captured moving image data produced by image capturing. The memory 30 is further used as a work area by the camera controller 50.

The compander 32 has a function of compressing and expanding image data with ADCT (Adaptive Discrete Cosine Transform) or others, and reads the image data from the memory 30 to perform thereon compressing and expanding processes.

A photometry unit 46 receives the image data from the camera controller 50, and detects an object luminance from the image data to produce photometry information. The camera controller 50, depending on the photometry information, causes a shutter controller 36 to control drive of the shutter 12 and transmits a stop control command to a stop controller 344 in the interchangeable lens 300 through the camera and lens communication I/Fs 38 and 338 to cause the stop controller 344 to control drive of the aperture stop 312. Thereby, auto exposure control (AE) is performed. A flash unit 48 projects an AF assist light to the object when AF is performed, and projects an illumination light thereto when image capturing is performed.

The camera controller 50 controls the entire camera 100. A memory 52 stores constants, variables and programs used by the camera controller 50. A display unit 54 constituted by a liquid crystal panel or the like displays characters, symbols and images. A non-volatile memory 56 is an electrically erasable and writable memory such as an EEPROM.

A mode dial 60 is operable by a user to select various image-capturing modes. A shutter switch includes an image-capturing preparation switch SW1 (62) that is turned ON by a half-press of a shutter button (not illustrated) to start processes such as AF, AE and AWB (auto white balance). The shutter switch further includes an image-capturing instruction switch SW2 (64) that is turned ON by a full-press of the shutter button to start image capturing.

An image display ON/OFF switch 66 is operated by the user to select display and non-display of images on the image display unit 28. A quick review ON/OFF switch 68 is operated by the user to select use or non-use of a quick review function of automatically reproducing the image data produced by image capturing immediately after the image capturing. An operation unit 70 includes various types of buttons and a touch panel.

A power controller 80 includes a battery detector, a DC/DC converter and a switch for selecting a power supply destination. The power controller 80 detects whether or not a battery is installed in the camera 100 and a remaining battery level, and controls the DC/DC converter depending on the detection results and in response to an instruction from the camera controller 50 to supply predetermined voltages to respective parts (including a recording medium 200) in the camera 100 and to the interchangeable lens 300.

Connectors 82 and 84 are used for connecting a power source 86 such as a primary battery, a secondary battery, an AC adapter and others to the camera 100. A memory interface 90 is provided for connecting the recording medium 200 such as a memory card or a hard disk to the camera 100. A connector 92 is physically connected to the recording medium 200. A recording medium detector 98 detects whether or not the recording medium 200 is connected to the connector 92.

The interchangeable lens 300 having a lens mount 306 that is mechanically coupled with the camera mount 106 is interchangeably (detachably) attached to the camera 100. The interchangeable lens 300 includes a zoom controller 340, the focus controller 342, the stop controller 344 and the lens controller 346. The camera mount 106 and the lens mount 306 are provided with electrical terminals 122 and 322 for electrically connecting the camera 100 and the interchangeable lens 300. The electrical terminals 122 and 322 enables communication of control signals, data and others between the camera controller 50 and the zoom, focus, stop and lens controllers 340, 342, 344 and 346 via the camera and lens communication I/Fs 38 and 388. The electrical terminals 122 and 322 further enables power supply from the camera 100 to the interchangeable lens 300.

The zoom controller 340 controls drive of a magnification-varying lens included in the lens unit 311 to perform zooming. The focus controller 342 and the stop controller 344 respectively control, as described above, in response to the focus control command and the stop control command from the camera controller 50, the drive of the focus lens in the lens unit 311 and the drive of the aperture stop 312.

The lens controller 346 controls the entire interchangeable lens 300. The lens controller 346 includes a memory storing constants, variables and programs used by the lens controller 346. A non-volatile memory 348 stores identification information uniquely provided to the interchangeable lens 300, optical information such as fully-opened and narrowest aperture values and focal length, and lens frame information.

The lens frame information indicates a diameter of an opening of a frame member (such as a fixed aperture frame of the aperture stop 312 and a lens frame holding the lens unit 311) defining a diameter of the light flux passing through the image-capturing optical system, and indicates a distance from the image sensor 14 to the frame member. The lens frame information depends on positions of the focus lens (focus positions) and positions of the magnification-varying lens (zoom positions). The lens controller 346 transmits, in response to a transmission request from the camera controller 50, the lens frame information corresponding to the focus and zoom positions to the camera controller 50.

Figure 2:
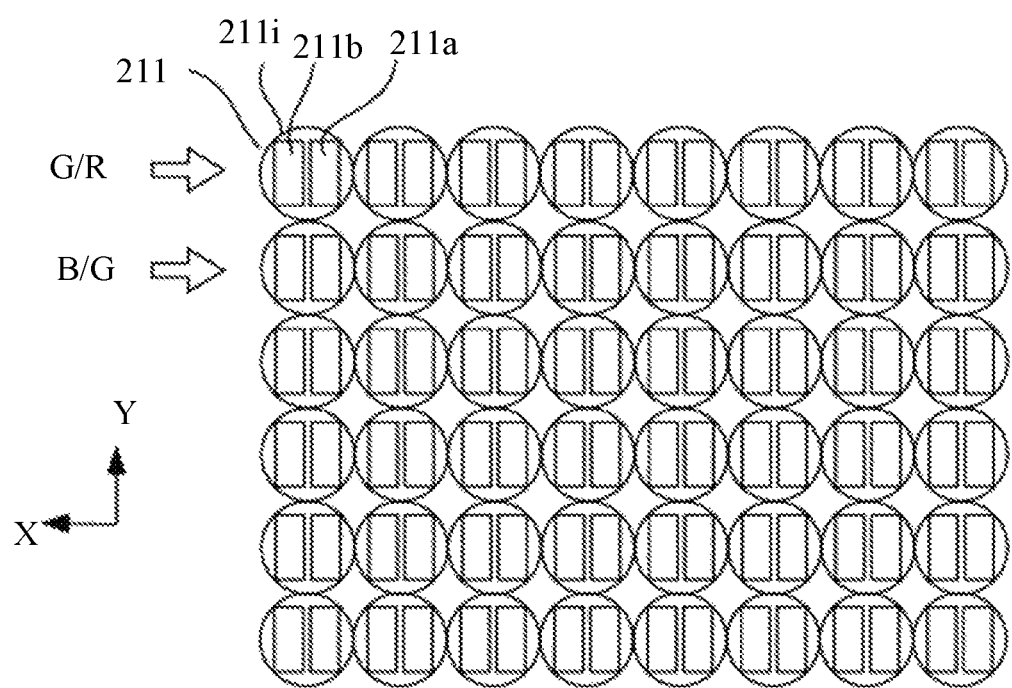
FIG. 2 illustrates pixel arrangement of an image sensor provided in the image-capturing apparatus of the embodiment.

Next, description will be made of a structure of the image sensor 14 and the imaging surface phase difference AF. FIG. 2 illustrates pixel arrangement in a partial area of the image sensor 14 as a two-dimensional C-MOS area sensor, which is viewed from an image-capturing optical system side; the partial area includes 6 pixels in a vertical (Y) direction and 8 pixels in a horizontal (X) direction.

The image sensor 14 is provided with color filters arranged in a Bayer arrangement. Odd row pixels 211 are provided with a green (G) color filter and a red (R) color filter arranged alternately from left in FIG. 2, and even row pixels 211 are provided with a blue (B) color filter and anther green (G) color filter arranged alternately from the left. A circle 211*i* indicates an on-chip microlens (hereinafter simply referred to as "a microlens"). Two rectangles 211*a* and 211*b* inside the microlens 211*i* indicate photoelectric converters.

In all the pixels 211, the two photoelectric converters 211*a* and 211*b* are divided in the X direction. A photoelectric conversion signal output from one of the two-divided photoelectric converters 211*a* and 211*b* and a sum of photoelectric conversion signals output from both the photoelectric converters 211a and 211b can be separately read out. Subtracting the photoelectric conversion signal output from the one of the photoelectric converters 211a and 211b from the sum of the photoelectric conversion signals output from both the photoelectric converters 211a and 211b provides a signal corresponding to a photoelectric conversion signal output from the other of the photoelectric converters 211a and 211b.

The photoelectric conversion signals output from the respective photoelectric converters 211a and 211b are used not only for producing the paired phase difference image signals (focus detection image data) in the imaging surface phase difference AF, but also for calculating an object distance and for producing paired parallax images having parallax to each other. Furthermore, the sum of the photoelectric conversion signals from both the photoelectric converters 211a and 211b is used as an image-capturing signal for producing a normal captured image.

Description will be made of a pupil division function of each pixel 211 as the focus detection pixel and the production of the paired phase difference image signals. In each pixel 211, the photoelectric converters 211a and 211b are disposed relative to the microlens 211i at off-center positions on different sides in the X direction. Thus, the photoelectric converters 211a and 211b receives, through the microlens 211i, light fluxes from mutually different areas of an exit pupil of the image-capturing optical system through which a light flux from an identical area of an object passes. Thereby, pupil division is performed.

A signal produced by uniting together the photoelectric conversion signals from the photoelectric converters 211a of multiple pixels 211 included in a predetermined area on an identical pixel row is referred to as "an A-image signal", and another signal produced by uniting together the photoelectric conversion signals from the photoelectric converters 211b of the multiple pixels 211 in the predetermined area is referred to as "a B-image signal".

As described above, the photoelectric conversion signal from the photoelectric converter 211b is the signal produced by subtracting the photoelectric conversion signal from the photoelectric converter 211a from the sum of the photoelectric conversion signals from the photoelectric converters 211a and 211b. These A-image signal and B-image signal are the paired phase difference image signals.

The A- and B-image signals may be produced by uniting together quasi-luminance signals each acquired by adding together the photoelectric conversion signals output from four pixels (R, G, G and B pixels) included in one Bayer arrangement unit of the color filters. The A- and B-image signals may be produced by uniting together the photoelectric conversion signals in each of R, G and B colors.

Performing correlation calculation on the A- and B-image signals thus produced enables providing a phase difference that is a relative shift amount between the A- and B-image signals. The phase difference enables calculating a defocus amount of an object image formed on the image sensor 14 (or of the image-capturing optical system).

This embodiment produces the A- and B-image signals in order to reduce a calculation load, improve an S/N ratio of the phase difference image signals and match the phase difference image signals to an output image size, by adding together the photoelectric conversion signals output from multiple pixels in the predetermined area by a later-described method.

Figure 3:
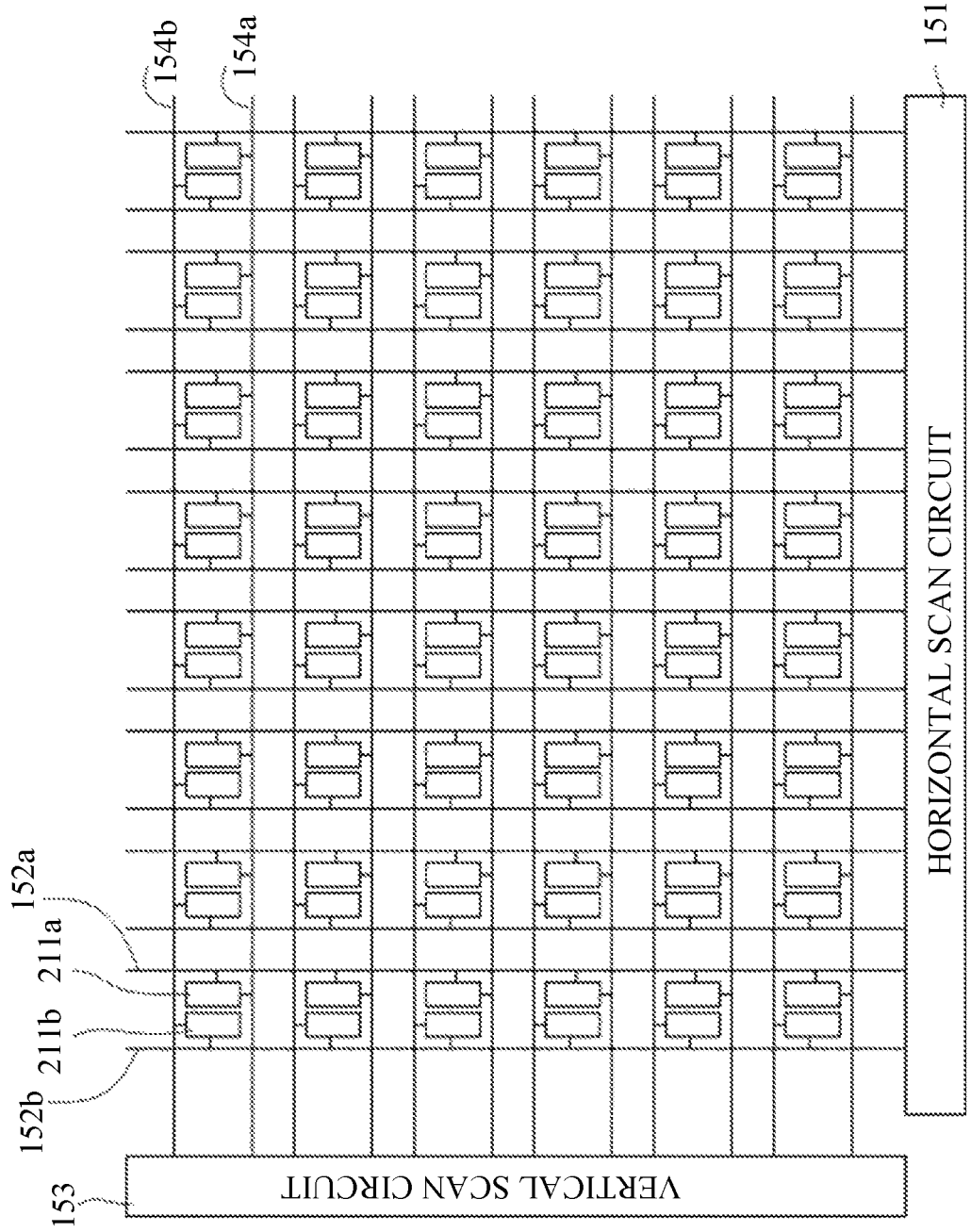
FIG. 3 illustrates a structure of a read-out portion of the image sensor.

FIG. 3 illustrates a structure of a read-out portion provided in the image sensor 14. The read-out portion includes a horizontal scan circuit 151 and a vertical scan circuit 153. Between the pixels (each including the photoelectric converters 211a and 211b), horizontal scan lines 152a and 152b and vertical scan lines 154a and 154b are provided. The horizontal scan circuit 151 and the vertical scan circuit 153 read out the photoelectric conversion signals from the pixels through the horizontal scan lines 152a and 152b and the vertical scan lines 154a and 154b.

Figures 4A, 4B:
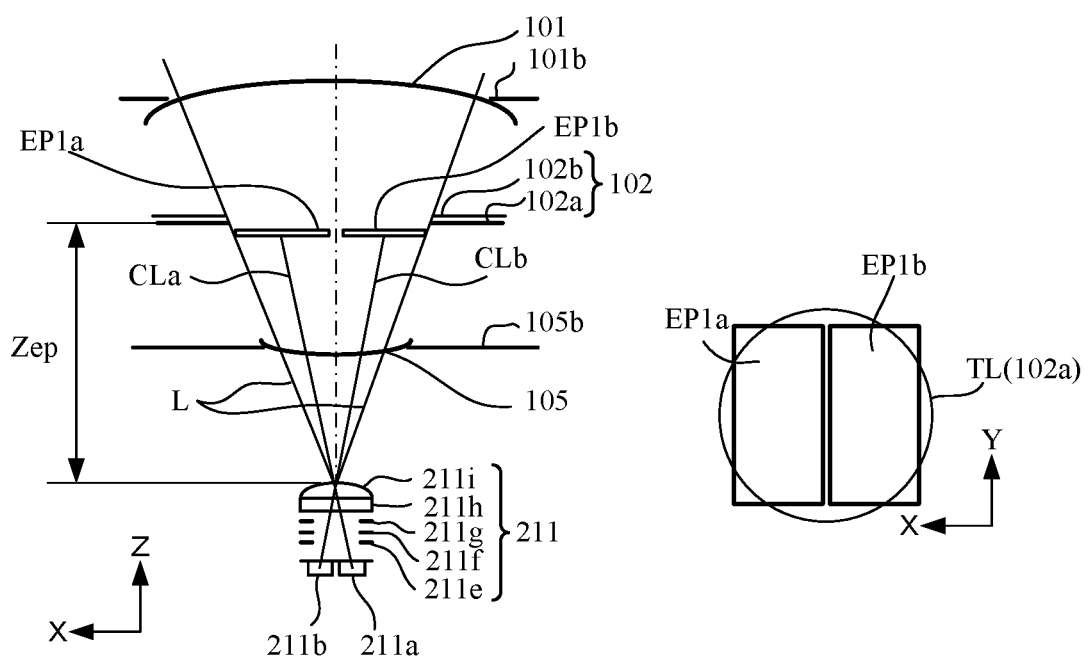
FIGS. 4A and 4B respectively illustrate a conjugate relation of photoelectric converters of the image sensor and projected images of the photoelectric converters to an exit pupil.

FIG. 4A illustrates a conjugate relation between the exit pupil (102) of the image-capturing optical system and the photoelectric converters 211a and 211b of the pixel 211 disposed near an image height of 0 (that is, near a center of an image surface). The microlens 211i provides the conjugate relation to the exit pupil (102) and the photoelectric converters 211a and 211b. The exit pupil (exit pupil plane) of the image-capturing optical system is typically located approximately on a plane at which a light quantity controlling iris (for example, the aperture stop 312) is disposed.

In zoom lenses (such as the image-capturing optical system of the interchangeable lens 300 illustrated in FIG. 1) having a magnification varying function, zooming may change a distance (hereinafter referred to as "an exit pupil distance") from the image surface to the exit pupil 102 and a size of the exit pupil (102). The image-capturing optical system illustrated in FIG. 4A has a focal length corresponding to a middle zoom position between a wide-angle end and a telephoto end. The exit pupil distance at the middle zoom position is defined as a normal exit pupil distance Zep. Under the normal exit pupil distance Zep, off-center parameters of the photoelectric converters 211a and 211b depending on a shape of the microlens 211i and an image height (X and Y coordinates) are set.

In FIG. 4A, reference numeral 101 denotes a first lens unit included in the image-capturing optical system, and reference numeral 101b denotes a lens barrel member holding the first lens unit 101. Reference numeral 105 denotes a third lens unit, and reference numeral 105b denotes a lens barrel member holding the third lens unit 105. Reference numeral 102 denotes an aperture stop corresponding to the aperture stop 312 illustrated in FIG. 1, and reference numeral 102a denotes an aperture plate (fixed aperture frame) that sets a fully-opened aperture diameter. Reference numeral 102b denotes stop blades for controlling an aperture diameter of the aperture stop 102.

The lens barrel member 101b, the aperture plate 102a, the stop blades 102b and the lens barrel member 105b, which are limiting members acting so as to limit the light flux passing through the image-capturing optical system are illustrated as an optical virtual image viewed from the image surface. A synthesized aperture near the aperture stop 102 is defined as the exit pupil, and a distance from this exit pupil (102) to the image surface is defined as the above-described exit pupil distance Zep.

As illustrated in FIG. 4A, the pixel 211 includes in order from its lowest layer, the two photoelectric converters 211a and 211b, multiple wiring layers 211e to 211g, a color filter 211h and the microlens 211i. Images of the two photoelectric converters 211a and 211b are projected by the microlens 211i to the exit pupil surface of the image-capturing optical system. In other words, the exit pupil (102) of the image-capturing optical system is projected through the microlens 211i to surfaces of the photoelectric converters 211a and 211b.

FIG. 4B illustrates the projected images EP1a and EP1b of the photoelectric converters 211a and 211b on the exit pupil surface of the image-capturing optical system. In FIG. 4A, L represents outermost light rays of the light flux passing through the image-capturing optical system. The outermost light rays L are limited by the aperture plate 102a of the aperture stop 102. In FIG. 4B, a circle TL represents the outermost light rays L. The circle TL includes therein-side most of the projected images EP1a and EP1b of the photoelectric converters 211a and 211b, so that the projected images EP1a and EP1b are almost not blocked by the image-capturing optical system.

Since the outermost light rays L (TL) is limited only by the aperture plate 102a of the aperture stop 102, a diameter of the outermost light rays L (TL) corresponds to the aperture diameter of the aperture plate 102a. Near the center of the image surface, slightly blocked portions of the projected images EP1a and EP1b are symmetric with respect to an optical axis (illustrated by a dashed-dotted line), so that light quantities received by the respective photoelectric converters 211a and 211b are equal to each other.

Figure 5:
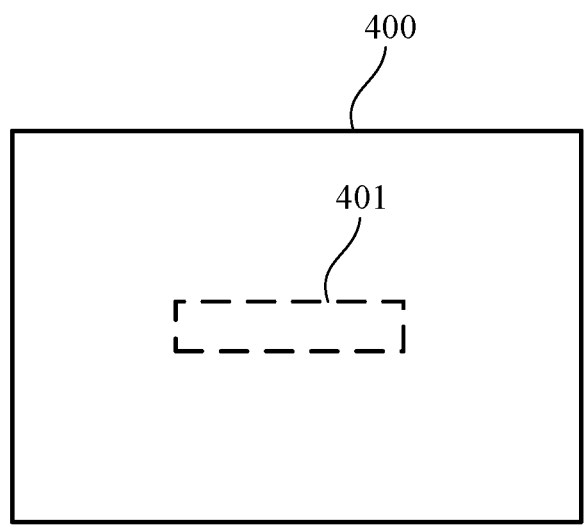
FIG. 5 illustrates a focus detection area in the embodiment.

FIG. 5 illustrates a focus detection area 401 set in an image-capturing area 400 where image capturing of objects can be made. The AF sensor phase difference AF and the imaging surface phase difference AF are performed on an object included in the focus detection area 401. In the focus detection area 401, the phase difference (that is, the defocus amount) is detected using a horizontal contrast difference in the image-capturing area 400.

Figure 6:
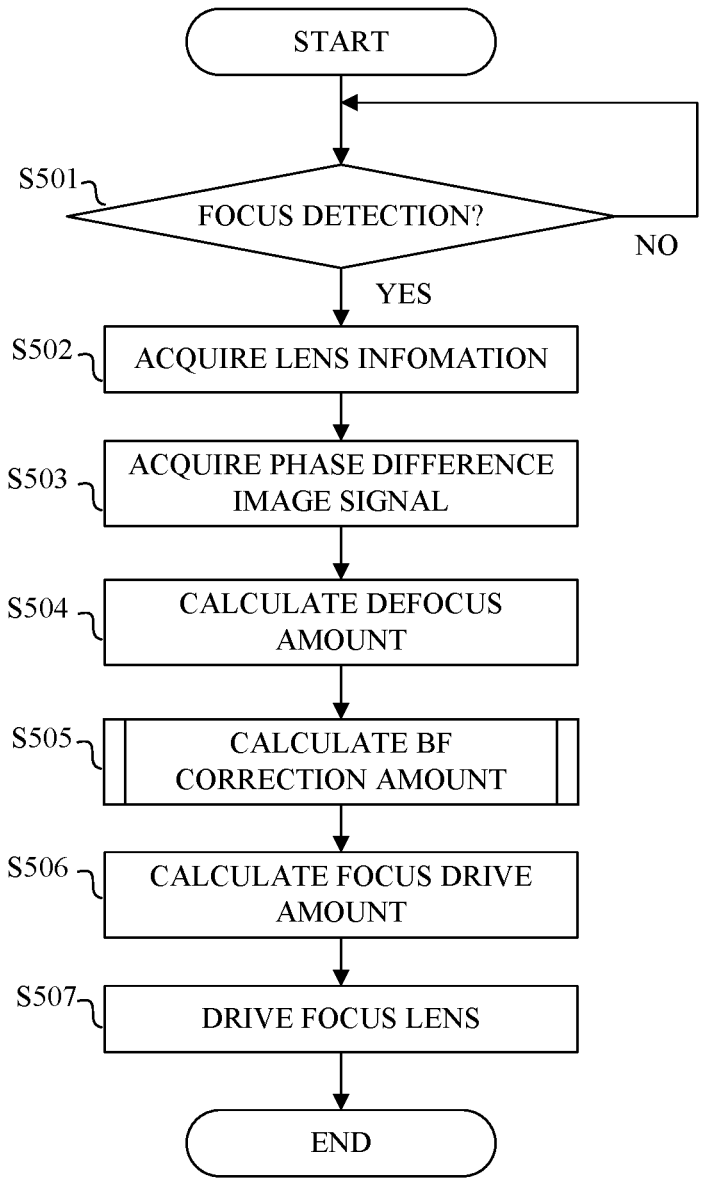
FIG. 6 is a flowchart of an AF process in the embodiment.

Next, description will be made of a process executed in the camera 100 by the camera controller 50 as a controller and an AF processor 42 as a first acquirer and a second acquirer with reference to a flowchart of FIG. 6. The camera controller 50 and the AF processor 42 each constituted by a computer execute this process according to a focus control program as a computer program. A phase deference AF in the following description may be any one of the AF sensor phase difference AF and the imaging surface phase difference AF.

First, at step S501, the camera controller 50 determines whether or not the image-capturing preparation switch SW1 (62) is turned on in response to the half-press of the shutter button. If the image-capturing preparation switch SW1 (62) is turned on, the camera controller 50 proceeds to step S502. Although in the above description the camera controller 50 determines whether or not the image-capturing preparation switch SW1 (62) is turned on, the camera controller 50 may proceed to step S502 in response to a transition from the live-view or moving image-capturing state to the optical view-finder state.

At step S502, the camera controller 50 acquires, from the lens controller 346 through communication therewith, lens information including the above-described lens frame information, information on the focus position and others.

Next at step S503, the AF processor 42 acquires the paired phase difference image signals from the focus detection unit 110 if the AF sensor phase difference AF is performed. The AF processor 42 acquires the paired phase difference image signals from the focus detection image data produced by the image processor 20.

Next at step S504, the AF processor 42 performs correlation calculation on the paired phase difference image signals to calculate a phase difference therebetween, and further calculates, from the phase difference, a defocus amount as a focus detection result.

Then, at step S505, the AF processor 42 calculates a BF correction amount as a correction amount for performing best focus (BF) correction. This BF correction amount will be described later.

Thereafter, at step S506, the AF processor 42 calculates a focus drive amount using the defocus amount calculated at step S504 and the BF correction value calculated at step S505. Specifically, the AF processor 42 adds the BF correction amount to the defocus amount to calculate a corrected defocus amount, and converts the corrected defocus amount into the focus drive amount. A focus position corresponding to the focus drive amount is one at which an in-focus position is obtained. This focus position is hereinafter referred to as "an in-focus focus position".

At step S507, the camera controller 50 transmits a focus control command including the focus drive amount calculated by the AF processor 42 to the focus controller 342 in the interchangeable lens 300 to cause the focus controller 342 to drive the focus lens by an amount corresponding to the focus drive amount. That is, the camera controller 50 performs focus control. The focus lens is thus driven to the in-focus focus position, and then the phase difference AF is ended.

Next, description will be made of a BF correction amount calculation process performed by the AF processor 42 at step S505 in FIG. 6 for calculating the BF correction amount with reference to a flowchart of FIG. 7.

The AF processor 42 having proceeded to step S505 first acquires, at step S5051, BF calculation conditions as parameters necessary for calculating the BF correction amount. The BF correction amount depends on conditions (image-capturing conditions) relating to the image-capturing optical system and the focus detection, such as the focus and zoom positions of the lens unit 311 and a position of the focus detection area 401 illustrated in FIG. 5. Therefore, the AF processor 42 acquires, as the BF calculation conditions, information on the focus and zoom positions from the lens controller 346 and information on the position of the focus detection area 401 from the camera controller 50.

Next at step S5052, the AF processor 42 acquires, from the lens controller 346 in the interchangeable lens 300, first BF correction information (first correction information) stored in the non-volatile memory 348 as a lens memory. The first BF correction information is hereinafter referred to as "a first BF correction amount". FIG. 8 illustrates an example of the first BF correction amount. FIG. 8 illustrates a data table of multiple first BF correction amounts stored in the non-volatile memory 348. This data table includes 64 first BF correction amounts BF111 to BF188 in 64 ranges provided by dividing each of the focus and zoom positions into 8 ranges. The AF processor 42 uses the first BF correction amount as the BF correction amount to correct the defocus amount depending on the focus and zoom positions in the interchangeable lens 300.

Figures 7, 8:
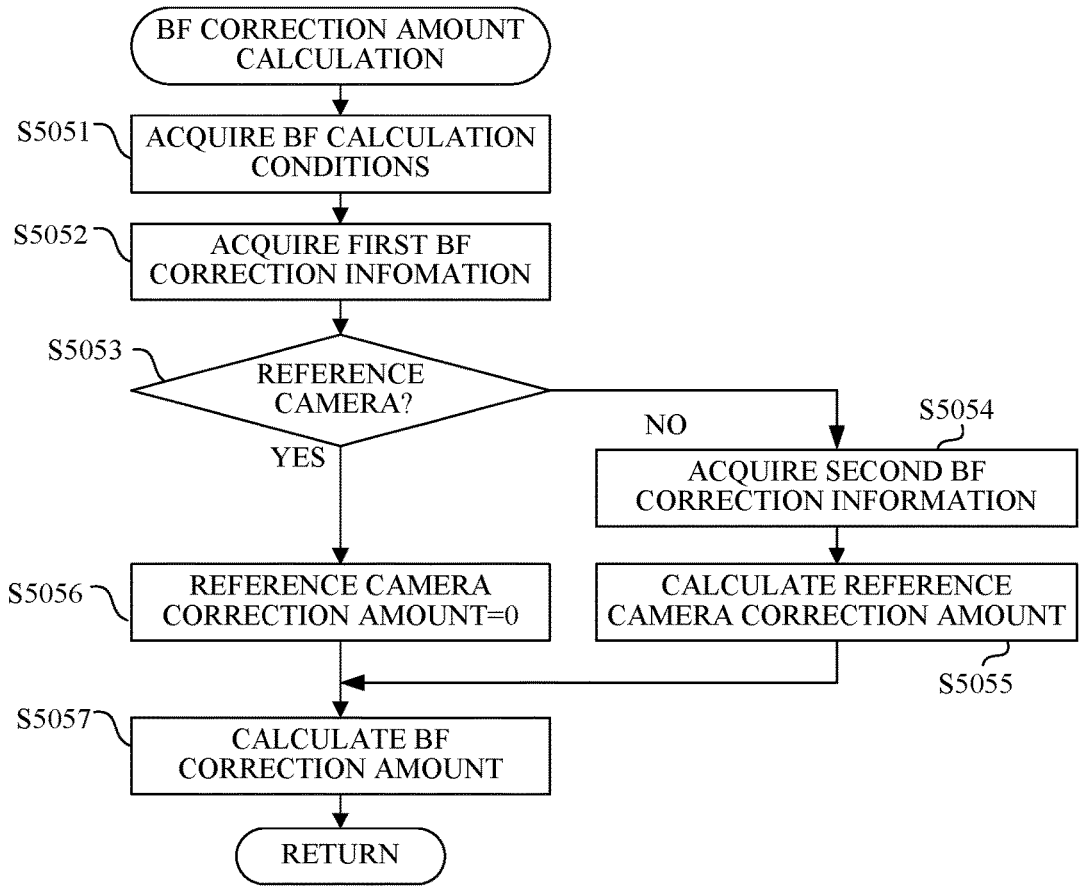
FIG. 7 is a flowchart of a subroutine for calculating a BF correction value in the embodiment.
FIG. 8 illustrates an example of first BF correction information in the embodiment.

The data table illustrated in FIG. 8 is an example corresponding to the focus detection area 401 located at a center of the image-capturing area 400 illustrated in FIG. 5. Such data tables for respective focus detection areas 401 located at positions other than the center are stored in the non-volatile memory 348. The non-volatile memory 348 may store, as the first BF correction amount, not only a correction amount (hereinafter referred to as "a design correction value") acquired from a design value of the interchangeable lens (image-capturing optical system) 300, but also another correction amount including a manufacturing error of the interchangeable lens 300, separately from the design correction value or as a combined correction amount with the design correction value.

Next at step S5053, the AF processor 42 determines whether or not the camera 100 calculating the BF correction amount is a reference camera for the interchangeable lens 300. Specifically, the AF processor 42 determines whether or not the camera 100 is identical to the reference camera indicated by reference camera information that is included in the lens information transmitted from the interchangeable lens 300.

The reference camera is a camera that has produced a reference image as a captured image used in focus evaluation for calculating the first BF correction amount stored in the non-volatile memory 348 in the interchangeable lens 300. The reference camera corresponds to a camera having a reference image sensor. When the interchangeable lens 300 is attached to the reference camera, correcting the defocus amount using the first BF correction amount as the BF correction amount enables calculating a highly accurate corrected defocus amount for producing the reference image as an in-focus image by that reference camera.

On the other hand, the interchangeable lens 300 is also attached to a camera (hereinafter referred to as "a non-reference camera") other than the reference camera. In this case, even though the defocus amount is corrected using the first BF correction amount as the BF correction amount, a highly accurate corrected defocus amount for a correction target image as a captured image produced by the non-reference camera may not be calculated. This is because the reference image and the correction target image have mutually different characteristics affecting visual focus states thereof. The characteristics of these images include their pixel pitches (that is, resoluble spatial frequency bands), colors such as white balance and contrast directions of the object in the focus detection area 401.

Therefore, in this embodiment the AF processor 42 determines at this step whether or not the camera 100 to which the interchangeable lens 300 is attached is the reference camera or the non-reference camera. If the camera 100 is the non-reference camera (that is, a camera having an image sensor other than the reference image sensor), the AF processor 42 proceeds to step S5054. If the camera 100 is the reference camera, the AF processor 42 proceeds to step S5056.

Even when determining at the determination step (S5053) that the camera 100 is the reference camera and, however, a captured image produced by that reference camera has a characteristic different from that of the reference image, the AF processor 42 proceeds to step S5054 as when determining that the camera 100 is the non-reference camera.

Figure 9A:
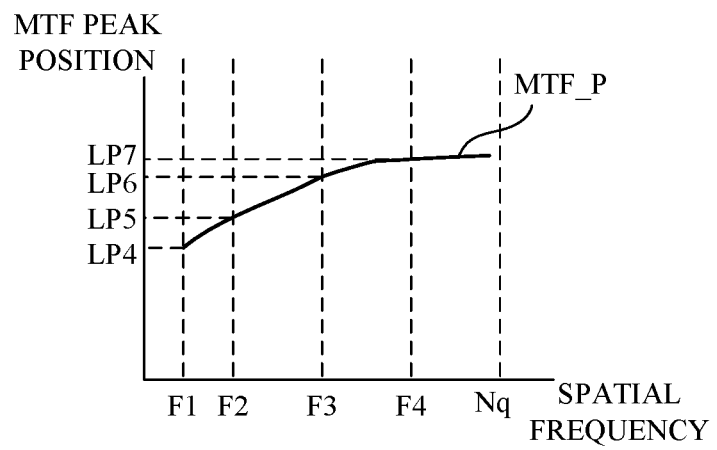
FIGS. 9A and 9B respectively illustrate a characteristic of an image-capturing optical system as an example of second BF correction information and evaluation frequency bands of a reference camera in the embodiment.
Figure 9B:
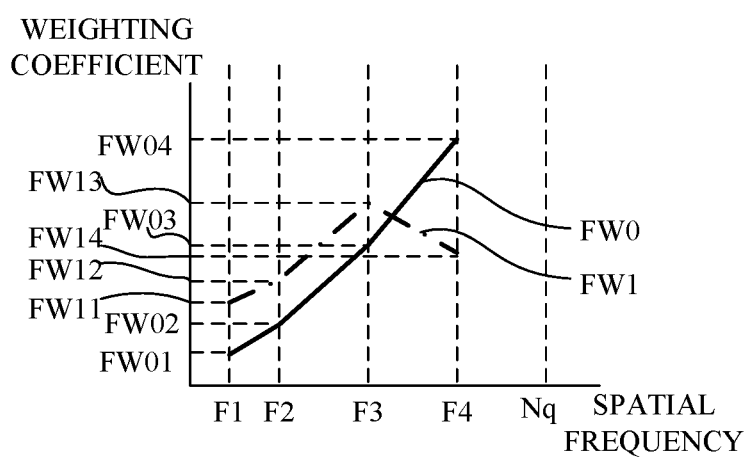

At step S5054, the AF processor 42 acquires, from the lens controller 346 in the interchangeable lens 300, second BF correction information that is part of second correction information. FIGS. 9A and 9B illustrate examples of the second BF correction information.

FIG. 9A illustrates MTF peak positions that are focus positions at which a defocus MTF becomes maximum values (peaks) at respective spatial frequencies. The MTF peak positions are information (aberration information) on a characteristic relating to aberration of the image-capturing optical system as part of the second BF correction information. The characteristic relating to the aberration is hereinafter referred to as "a characteristic of the image-capturing optical system". A horizontal axis indicates discrete spatial frequencies F1, F2, F3 and F4. A vertical axis indicates MTF peak positions LP4, LP5, LP6 and LP7 at the spatial frequencies F1, F2, F3 and F4.

In this embodiment, the MTF peak positions LP4, LP5, LP6 and LP7 are stored in the non-volatile memory 348 as MTF_P(n) ($1 \leq n \leq 4$). The MTF_P(n) for the respective 64 ranges provided by dividing each of the focus and zoom positions into 8 ranges are stored as the MTF peak positions in the non-volatile memory 348. The values of MTF_P(n) may be stored for respective wavelengths corresponding to object colors and for respective contrast directions. In this case, the object color and the contrast direction are set, and MTF_P(n) adequate for the set object color and contrast direction is used.

FIG. 9B indicates evaluation frequency bands (first characteristic information) of the reference camera as other part of the second BF correction information. The evaluation frequency bands are frequency bands of the captured image (image-capturing signal) produced by the reference camera, and are calculated depending on frequency characteristics of the object, the image-capturing optical system and the reference image sensor, and depending on a frequency band in which a viewer of the captured image evaluates the focus state (visual focus state) of the captured image.

The frequency characteristic of the object may be acquired by, for example, performing Fourier transform on the image-capturing signal in the focus detection area 401 or may be a frequency characteristic of a representative object. The frequency characteristic of the reference image sensor is set depending on the pixel pitch of the captured image and others. The frequency bands in which the viewer evaluates the focus state of the captured image are set depending on a viewing distance of the captured image (that is, a distance between a monitor displaying the captured image and the viewer), a luminance of a viewing environment (indoor viewing, outdoor viewing and others) and a viewing size of the captured image.

In this embodiment, as the evaluation frequency bands of the reference camera, frequency bands more adequate for evaluating the focus state of the captured image produced by the reference camera are represented by larger weighting coefficients.

FIG. 9B illustrates, by a solid line, the weighting coefficients indicating the evaluation frequency bands of the reference camera as FW0. In FIG. 9B, frequency bands F1, F2, F3 and F4 correspond to the frequency bands F1, F2, F3 and F4 in FIG. 9A. The weighting coefficients FW0 for the frequency bands F1, F2, F3 and F4 have a relation of FW01<FW02<FW03<FW04. In the following description, FW01 to FW04 are represented by FW0(n) ($1 \leq n \leq 4$).

At the above-described step S5054, the AF processor 42 acquires, from the lens controller 346, the characteristic (MTF_P(n)) of the image-capturing optical system stored as the second BF correction information in the non-volatile memory 348 and information on the evaluation frequency bands (FW0(n)) of the reference camera.

Next at step S5055, the AF processor 42 acquires evaluation frequency bands (second characteristic information) of the non-reference camera (that is, the camera 100) stored in a memory 52 as a camera memory. Furthermore, the AF processor 42 calculates a reference camera correction amount that is a correction amount for correcting an error generated due to difference between the characteristics of the correction target image produced by the camera 100 as the non-reference camera that calculates the BF correction amount and the reference image produced by the reference camera. The difference between the characteristics is mainly difference between the evaluation frequency bands of the reference and correction target images.

FIG. 9B illustrates the evaluation frequency bands of the non-reference camera (camera 100) stored in the memory 52 as FW1 by a dashed-dotted line. As the evaluation frequency bands of the reference camera, the evaluation frequency bands more adequate for evaluating the focus state of the correction target image produced by the non-reference camera are represented by larger weighting coefficients. The weighting coefficients FW1 for the frequency bands F1, F2, F3 and F4 have a relation of FW11<FW12<FW13<FW14. In the following description, FW11 to FW14 are represented by FW1($n$) (1≤n≤4).

FIG. 9B illustrates that the correction target image produced by the non-reference camera is adequate for the evaluation of the focus state at a lower frequency band (F1 to F3) than that of the reference image produced by the reference camera. Such a relation is generated in a case where, for example, the pixel pitch of the captured image produced by the non-reference camera is larger than that of the captured image produced by the reference camera, and a distance assumed as the viewing distance for the captured image produced by the non-reference camera is longer than that of the captured image produced by the reference camera. In the case where such a relation is established, the AF processor 42 calculates the reference camera correction amount BF2 using the following expression.

$$BF2 = \sum_{n=1}^{4} (MTF\_P(n) \times (FW1(n) - FW0(n)))$$

The above expression calculates difference between the focus positions, using MTF_P(n) that is the characteristic of the image-capturing optical system and difference between the evaluation frequency bands of the reference and non-reference cameras. The reference camera correction amount BF2 calculated using MTF_P(n) and (FW1($n$)–FW0($n$)) corresponds to the second correction information depending on the difference between the characteristics of the reference image and the correction target image.

In this embodiment, since a best evaluation frequency band of the reference camera is around the spatial frequency band F4, a focus position near the MTF peak position LP7 at the spatial frequency F4 is calculated as the in-focus focus position. On the other hand, since a best evaluation frequency band of the non-reference camera is around the spatial frequency band F3, a focus position near the MTF peak position LP6 at the spatial frequency F3 is calculated as the in-focus focus position. The reference camera correction amount BF2 is calculated as difference between these two MTF peak positions (that is, difference between the in-focus focus positions). After thus completing the calculation of the reference camera correction amount BF2 at step S5055, the AF processor 42 proceeds to step S5057.

On the other hand, at step S5056, the AF processor 42 sets the reference camera correction amount BF2 to 0. Then, the AF processor 42 proceeds to step S5057.

At step S5057, the AF processor 42 calculates the BF correction amount BF using the following expression.

$$BF=BF1+BF2$$

In the above expression, BF1 represents the first BF correction amount calculated at step S5052, and BF2 represents the reference camera correction amount calculated at step S5055 or S5056. The AF processor 42 having thus calculated the BF correction amount at step S5057 ends the BF correction amount calculation process, and then proceeds to step S506 in FIG. 6.

This embodiment can accurately correct the defocus amount even when the image-capturing condition of the non-reference camera actually correcting the defocus amount is different from the calculation conditions for calculating the correction amount (BF1) stored in the interchangeable lens. Specifically, this embodiment assumes the case where the correction amount (BP1) stored in the interchangeable lens is calculated depending on the evaluation frequency bands of the reference camera.

In this case, the non-reference camera acquires, from the interchangeable lens, the information on the characteristic of the image-capturing optical system and the information on the evaluation frequency bands of the reference camera, and calculates the reference camera correction amount BP2 depending on the difference between the evaluation frequency bands of the reference camera and the evaluation frequency bands of the non-reference camera stored in the non-reference camera. Correcting the defocus amount using both the reference camera correction amount BP2 and the first BF correction amount BF1 calculated for the reference camera enables performing accurate correction of the defocus amount.

The above embodiment described the difference between the correction amounts for the reference and non-reference cameras; the difference is generated due to the difference between the evaluation frequency bands of the reference and non-reference cameras. However, the difference between the correction amounts is generated due to not only the difference between the evaluation frequency bands, but also difference between contrast evaluation directions and difference between spectral states (colors).

In this case, the non-reference camera may acquire, from the interchangeable lens, information on a characteristic of the image-capturing optical system for the difference between the contrast evaluation directions or the spectral states and the information on the evaluation frequency bands of the reference camera, and calculate the correction amount using the characteristic of the image-capturing optical system, the evaluation frequency bands of the reference camera and the evaluation frequency bands of the non-reference camera. This enables correcting the difference between the correction amounts due to the difference between the contrast evaluation directions or the spectral states, as well as the difference between the correction amounts due to the difference between the evaluation frequency bands.

Furthermore, the evaluation frequency bands are affected by the pixel pitch of the captured image, so that the reference camera correction amount may be calculated depending on the pixel pitch of the captured image. For example, the reference camera correction amount may be calculated using the evaluation frequency bands switched between still image capturing and moving image capturing.

Moreover, in the above embodiment the camera 100 acquires, from the interchangeable lens 300, the first BF correction amount, the characteristic of the image-capturing optical system and the information on the evaluation frequency band (first characteristic information) of the reference camera.

In addition, in the above embodiment the camera 100 stores the information on the evaluation frequency bands (second characteristic information) of that camera (non-reference camera) 100 to the memory 52 provided therein. However, in a case of using an interchangeable lens incompatible with the correction amount calculation method described in the above embodiment, the camera 100 may store part of information having been stored in the interchangeable lens. In this case, the camera 100 may acquire the first BF correction amount and lens identification information from the interchangeable lens, and acquire, depending on the lens identification information, the information on the characteristic of the image-capturing optical system and the evaluation frequency bands of the reference camera that are stored in the camera 100. This enables highly accurate correction also for an interchangeable lens manufactured before the camera 100 of this embodiment.

Furthermore, although the above embodiment described the case where the camera 100 acquires, from the interchangeable lens 300, the second BF correction information indicating the characteristic of the image-capturing optical system and the evaluation frequency bands of the reference camera, the second BF correction information is not limited thereto. For example, the camera 100 may acquire, as the second BF correction information, a correction amount to be added to the defocus amount calculated at step S504, which is similar to the first correction information.

In this case, it is necessary for the interchangeable lens to store multiple correction amounts depending on the evaluation frequency bands of the camera. However, this case enables reducing a communication amount for acquiring the second BF correction information at step S5054 and a calculation amount for calculating the reference camera correction amount at step S5055.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225557, filed on Nov. 18, 2016, which is hereby incorporated by reference herein in its entirety.

What is claimed is:

1. An image-capturing apparatus comprising:
   an image sensor configured to capture an object image formed by an image-capturing optical system;
   a memory device that stores a set of instructions; and
   at least one processor that execute the set of instructions to function as:
      a focus detector configured to produce a focus state of the image-capturing optical system to produce focus detection information;
      a first acquirer configured to acquire a first correction value relating to the image-capturing optical system, the first correction value being acquired based on prestored information;
      a second acquirer configured to acquire a second correction value relating to the image sensor, the second correction value being acquired depending on difference between a frequency characteristic of a signal obtained by the image sensor in the image-capturing apparatus and a frequency characteristic of a signal obtained by a reference image sensor in a reference image-capturing apparatus used for acquiring the first correction value; and
      a controller configured to perform focus control using the focus detection information corrected with the first and second correction values.

2. An image-capturing apparatus according to claim 1, wherein the frequency characteristics of the signals of the image sensor and the reference image sensor depend on their pixel pitches.

3. An image-capturing apparatus according to claim 1, wherein the second correction value is acquired depending on difference between a frequency band of a signal used in evaluating the focus state of the image-capturing apparatus and a frequency band of a signal used in evaluating a focus state of the reference image-capturing apparatus.

4. An image-capturing apparatus according to claim 1, wherein the second correction value corresponds to difference between (a) a focus position calculated from information on aberration of the image-capturing optical system and the frequency characteristic of the signal obtained from the reference image sensor of the reference image-capturing apparatus and (b) a focus position calculated from information on the aberration of the image-capturing optical system and the frequency characteristic of the signal obtained from the image sensor of the image-capturing apparatus.

5. An image-capturing apparatus according to claim 4, wherein:
   the image-capturing optical system is included in an interchangeable lens that is detachably attachable to the image-capturing apparatus; and
   the information on the aberration of the image-capturing optical system is acquired from the interchangeable lens.

6. An image-capturing apparatus according to claim 1, wherein the image sensor includes two-dimensionally arranged pixels each including one microlens and multiple photoelectric converters.

7. An image-capturing apparatus according to claim 1, wherein the image sensor includes multiple photoelectric converters capable of photoelectrically converting light fluxes passing through mutually different pupil areas of the image-capturing optical system and thereby outputting paired focus detection signals.

8. An image-capturing apparatus according to claim 4, wherein the information on the aberration of the image-capturing optical system includes peak positions of defocus MTFs for respective spatial frequencies.

9. An image-capturing apparatus according to claim 4, wherein the information on the aberration of the image-capturing optical system depends on at least one of zoom positions, focus positions, wavelengths of object's colors and contrast directions.

10. An interchangeable lens detachably attachable to an image-capturing apparatus, the interchangeable lens comprising:
- an image-capturing optical system;
- a first memory configured to store a first correction value relating to the image-capturing optical system;
- a second memory configured to store information on aberration of the image-capturing optical system;
- a communicator configured to communicate with the image-capturing apparatus,
- wherein the communicator is configured to transmit the first correction value and the information on the aberration to the image-capturing apparatus, and configured to receive, from the image-capturing apparatus, a focus control command for the image-capturing optical system, the command being produced by the image-capturing apparatus using a focus detection result corrected with the first correction value and the information on the aberration.

11. An interchangeable lens according to claim 10, wherein the information on the aberration of the image-capturing optical system includes peak positions of defocus MTFs for respective spatial frequencies.

12. An interchangeable lens according to claim 10, wherein the information on the aberration of the image-capturing optical system depends on at least one of zoom positions, focus positions, wavelengths of object's colors and contrast directions.

13. A method of controlling an image-capturing apparatus including an image sensor configured to capture an object image formed by an image-capturing optical system, the method comprising the steps of:
- detecting a focus state of the image-capturing optical system to produce focus detection information;
- acquiring a first correction value relating to the image-capturing optical system, the first correction value being acquired based on prestored information;
- acquiring a second correction value relating to the image sensor, the second correction value being acquired depending on difference between a frequency characteristic of a signal obtained by the image sensor in the image-capturing apparatus and a frequency characteristic of a signal obtained by a reference image sensor in a reference image-capturing apparatus used for acquiring the first correction value; and
- performing focus control using the focus detection information corrected with the first and second correction values.

14. A non-transitory storage medium storing a focus control program that causes a computer in an image-capturing apparatus including an image sensor configured to capture an object image formed by an image-capturing optical system to execute a control method, the control method comprising:
- detecting a focus state of the image-capturing optical system to produce focus detection information;
- acquiring a first correction value relating to the image-capturing optical system, the first correction value being acquired based on prestored information;
- acquiring a second correction value relating to the image sensor, the second correction value being acquired depending on difference between a frequency characteristic of a signal obtained by the image sensor in the image-capturing apparatus and a frequency characteristic of a signal obtained by a reference image sensor in a reference image-capturing apparatus used for acquiring the first correction value; and
- performing focus control using the focus detection information corrected with the first and second correction values.

* * * * *